United States Patent [19]

Ishimoto

[11] Patent Number: 5,157,621
[45] Date of Patent: Oct. 20, 1992

[54] CIRCUIT AND METHOD FOR FORMING PULSE TRAIN OUTPUT IN RESPONSE TO CARRY/BORROW OUTPUT OF COUNT PULSE TRAIN

[75] Inventor: Shigeru Ishimoto, Tokyo, Japan

[73] Assignee: Sony Magnescale Inc., Japan

[21] Appl. No.: 606,915

[22] Filed: Oct. 31, 1990

[30] Foreign Application Priority Data

Nov. 2, 1989 [JP] Japan .................................. 1-286397

[51] Int. Cl.$^5$ ............................................. G06F 1/02
[52] U.S. Cl. ..................................... 364/702; 364/768
[58] Field of Search .............................. 364/701–703, 364/784, 768

[56] References Cited

U.S. PATENT DOCUMENTS

| | | | |
|---|---|---|---|
| 4,432,065 | 2/1984 | Heinle | 364/701 |
| 4,473,885 | 9/1984 | Kamimaru et al. | 364/701 X |
| 5,012,437 | 4/1991 | Recker et al. | 364/701 |

FOREIGN PATENT DOCUMENTS 61-83911 4/1986 Japan .

Primary Examiner—Tan V. Mai
Attorney, Agent, or Firm—Ronald P. Kananen

[57] ABSTRACT

A circuit and method for forming a pulse train output in response to a carry/borrow signal from a calculation of an input pulse train are disclosed in which a plurality of sign-less adders/subtractors and a pulse train output generating circuit are installed. The input pulse train has an interval corresponding to a reference input quantity (0.3517 μm) which is less than a predetermined physical quantity (e.g., 1 μm). Each pulse of the output pulse train has an interval corresponding to the predetermined physical quantity. The adder/subtractors carry out an addition or subtraction of two input numerical values, each numerical value corresponding to the reference unit quantity according to a direction of the input pulse train, whenever one input pulse is received. The pulse train output generating circuit generates the output pulse train, with each pulse interval corresponding to the physical quantity, in response to either, carry or, borrow signal derived as the result of an addition or a subtraction of the adder/subtractors. In the preferred embodiment, the number of the adder/subtractors corresponds to the number of digits in the reference unit quantity.

13 Claims, 4 Drawing Sheets

CIRCUIT AND METHOD FOR FORMING PULSE TRAIN OUTPUT IN RESPONSE TO CARRY/BORROW OUTPUT OF COUNT PULSE TRAIN

BACKGROUND OF THE INVENTION (1) Field of the Invention

The present invention relates generally to a circuit for forming a pulse train output suitable for use with, e.g., a laser interferometer.

(2) Background of the art

In general, to derive a physical quantity using pulses output from a predetermined sensor, a product of an accumulated number of pulses and a reference unit quantity corresponding to each pulse (for example, length per pulse, time per pulse, and weight per pulse) can be calculated.

For example, with a laser interferometer, exemplified by a Japanese Patent Application First Publication Showa 61-83911 published on Apr. 28, 1986, if a wavelength of a laser light ray is $\lambda$, one pulse is derived from the sensor whenever a change of $\lambda/2$ in displacement occurs. If the wavelength is, e.g., 0.7034 micrometer and the accumulated number of pulses derived from the sensor is N, a final measured value of displacement V is expressed as follows:

$$V = N \times \lambda/2 = N \times 0.3517 \, [\mu m] \quad (1)$$

In this way, the measured value can be derived by multiplying the accumulated number of pulses N by $\lambda/2$.

When the displacement is increased at a constant speed $\omega$, an actual displacement changes as denoted by a broken line of FIG. 4 with respect to the time t. Moreover, if the time required to execute the calculation of the equation (1) is $\Delta T$, the calculated value V is derived a time $\Delta T$ after the number of pulses N are latched, corresponding to a point Po at a time $t_o$ of FIG. 4. However, after the pass of time $\Delta T$, the displacement is increased by $\epsilon_1 (=w \Delta T)$ so that the measured value V with respect to time t is changed as denoted by a solid line. Hence, with an offset value thereof neglected, a maximum of $\epsilon_1$ of error occurs in the measured value, as appreciated from FIG. 4.

In order to reduce the error of the measured value V, the calculation time $\Delta T$ of the equation (1) may be reduced. To meet such a demand, a high speed, expensive and large scale calculating processor needs to be used. It is inconvenient for such a calculating processor to be installed in the laser interferometer.

Furthermore, when the values of effective digit numbers of the wavelength and accumulated number of pulses N become large, a limitation on shortening the calculation time arises. Additionally, the concept of deriving the measured value described above cannot be used in an application requiring a real time processing field used as a feedback element of an NC (Numerical Control) machine tool.

The measured value V derived by the calculation in the way expressed in the equation (1) has, e.g. a decimal fraction, for instance a fraction of 0.2755 in a number 5.2755. However, an accuracy of a measured value V generally corresponds to a quantity of one pulse, and less importance is placed on its decimal fraction. Hence, if one pulse of $\lambda/2$, is i.e., 0.3517 $\mu$m, the measured value V has a resolution of 1 $\mu$m, with eliminating the decimal fraction. Furthermore, with the decimal fraction eliminated, a pulse train whose interval corresponds to the physical quantity (for example, 1 $\mu$m) fraction is eliminated is formed to count the number of pulses in the pulse train. It should be noted that in the method for carrying out the calculation in the way of equation (1), the forming of the pulse train whose interval corresponds to the physical quantity from which the decimal fraction is eliminated generally results in high cost.

SUMMARY OF THE INVENTION

It is an object of the present invention to provide a circuit and method for forming a pulse train whose interval of each pulse corresponds to a physical quantity from which a decimal fraction is eliminated in a real time even when each interval of the input pulse train corresponds to the physical quantity having the decimal fraction.

The above-described object can be achieved by providing an apparatus for forming a pulse train, comprising: a) at least one sign-less adder/subtractor for adding or subtracting a numerical value corresponding to a reference unit quantity whenever one pulse is input, the one input pulse corresponding to the reference unit quantity less than a predetermined unit quantity; and b) a pulse generating circuit for generating an output pulse train whose interval corresponds to the predetermined unit quantity in response to either a carry output as the result of addition by the adder/subtractor or borrow output as the result of subtraction by the adder/subtractor.

The above-described object can also be achieved by providing a method for forming an output pulse train, comprising the steps of: a) counting a numerical value corresponding to a reference unit quantity whenever one pulse is input incrementally or decrementally by the numerical value according to a direction of addition or subtraction of the input pulse signal, the one input pulse corresponding to the reference unit quantity less than a predetermined unit quantity; and b) generating an output pulse train whose interval corresponds to the predetermined unit quantity in response to either a carry output as the result of incremental counting or borrow output as the result of decremental counting in the step a).

The above-described object can also be achieved by providing a system for forming an output pulse train indicating a numerical value of a predetermined physical quantity for each output pulse, comprising: a) an arithmetic operation unit for carrying out either addition or subtraction of numerical values, each corresponding to a reference unit quantity, according to an input pulse having either addition direction or subtraction direction whenever the input pulse is received, the input pulse having an interval corresponding to the reference unit physical quantity, which is less than the predetermined physical quantity, and producing either a carry or a borrow signal whenever a carry or a borrow occurs therefrom; and b) first means for producing the output pulse train whose interval corresponds to the predetermined quantity whenever the carry or borrow signal is received.

DETAILED DESCRIPTION OF THE PREFERRED EMBODIMENTS:

Reference will hereinafter be made to the drawings in order to facilitate a better understanding of the present invention.

Figure 1:
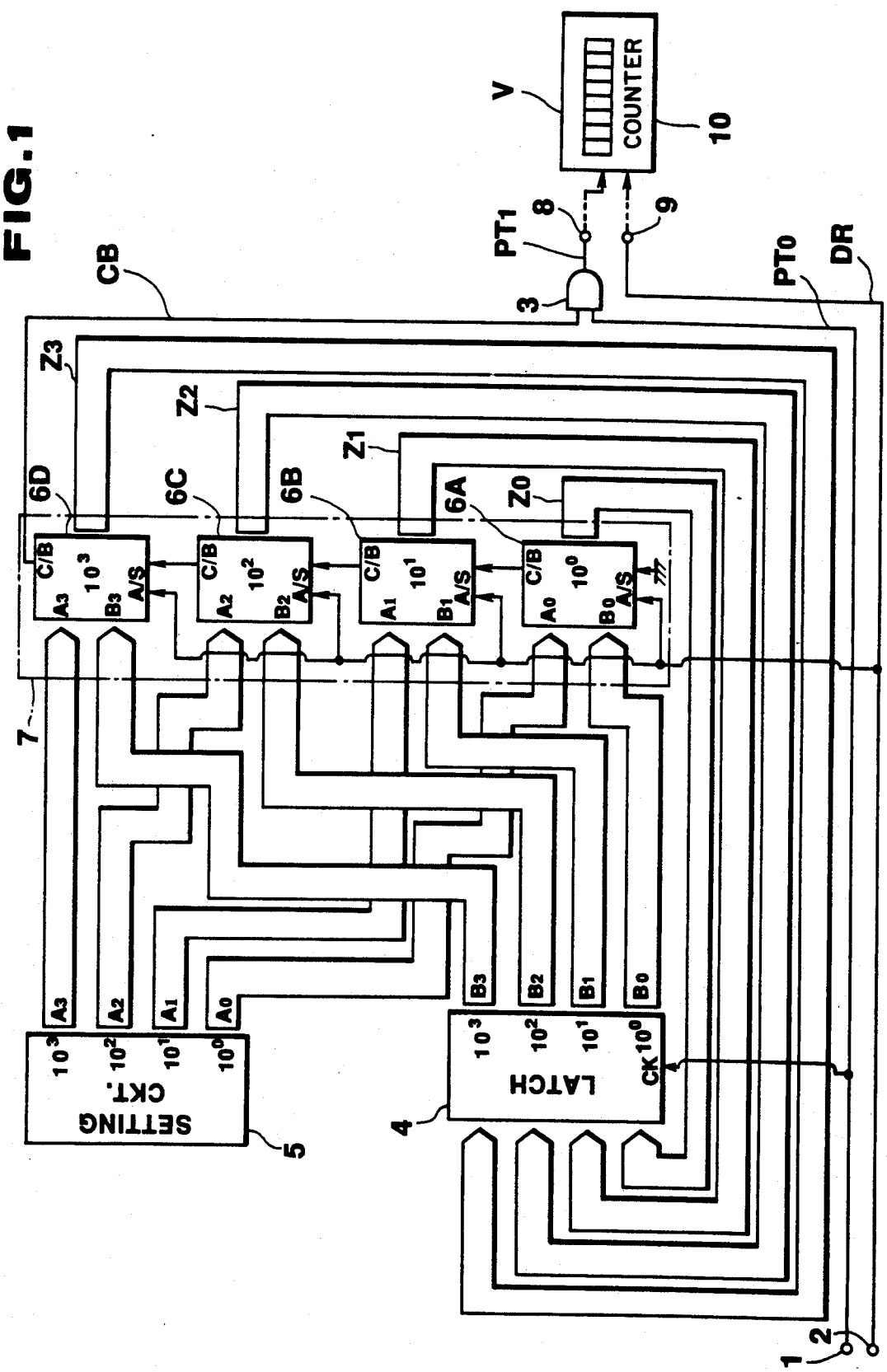
FIG. 1 is a circuit block diagram of a circuit for forming a pulse train according to the present invention.

FIG. 1 shows a preferred embodiment of a pulse train forming circuit according to the present invention.

In the preferred embodiment, the present invention is applicable to a case where a physical quantity, a reference unit quantity corresponding to the interval of an input pulse train $PT_0$, is less than the measurement resolution corresponding to the interval of an output pulse train $PT_1$. Specifically, an interval of the input pulse train $PT_o$ substantially corresponds, for example, to 0.3517 $\mu$m and an interval of the output pulse train $PT_1$ substantially corresponds, for example, to 1 micrometer ($\mu$m).

In FIG. 1, an input end (1) receives the input pulse train $PT_o$ whose pulse interval corresponds to 0.3517 $\mu$m from a sensor portion (not shown) and another input end (2) receives a directional input pulse DR from the sensor portion. The directional input pulse DR provides a high level "1" when the displacement increases and provides a low level "0" when the displacement decreases. In addition, an AND gate circuit (3) has one input end receiving the input pulse train $PT_o$.

It is noted that the structure of the sensor portion is exemplified by a Japanese Patent Application First Publication Showa 61-83911 published on Apr. 28, 1986, the disclosure of which is hereby incorporated by reference. It is also noted that an output signal from the laser interferometer is generally divided into up and down signals, the input pulse $PT_o$ is derived from an OR gate circuit receiving the up and down signals, and the directional input DR is formed with a flip-flop circuit having two AND gate circuits having two inputs receiving the up and down signals.

A latch circuit of four decimal digits (4) and a setting circuit (5) are installed. The setting circuit (5) can set any arbitrary numerical value A of four decimal digits. A numerical value A in orders of $10^0$ through $10^3$ set by the setting circuit (5), represented by a binary coded decimal (BCD) is expressed as $A_0$ through $A_3$. A numerical value B in orders of $10^0$ through $10^3$ is held at an output end of the latch circuit (4). A clock terminal CK of the latch circuit (4) receives the input pulse train $PT_o$.

In addition, (6A) through (6D) denote adder/subtractors each having two inputs and one decimal digit. The numerical values of $A_o$ and $B_o$ are supplied to two input ports of adder/subtractor (6A). The two input ports of the remaining adders/subtractors (6B), (6C), and (6D) receive the pair of numerical values $A_1$ and $B_1$, $A_2$ and $B_2$, and $A_3$ and $B_3$, respectively. The low level of "0" is supplied to a carry/borrow input end of the first adder/subtractor (6A). The output ends C/B of the adder/subtractors (6A) through (6C) are connected to the carry/borrow input ends of the adder/subtractors (6B) through (6D), respectively. The carry/borrow signal C/B generated at the adder/subtractor (6D) is supplied to the other input end of the AND gate circuit (3).

In addition, the add/subtract terminals A/S of the adder/subtractors (6A) through (6D) are supplied with the directional input DR. When the directional input DR is at the high level of "1", these adder/subtractors (6A) through (6D) carry out the additions of the two input numbers of pulses. When the directional input DR indicates the low level of "0", the other input number $A_i$ is subtracted from the other input number $B_i$, where i varies from 0 to 3. The adder/subtractors (6A) through (6D) are constituted by an arithmetic operation unit (7). The numerical values represented by BCD appear on an output port of the adder/subtractors (6A) through (6D) as $z_0$ through $z_3$, respectively. The accumulated value of Z having decimal four digits is constituted by the numerical values $Z_0$ through $Z_3$. Numerical values $Z_0$ through $Z_3$ are in the orders of $10^0$ through $10^3$ and are supplied to the input port of orders of $10^0$ through $10^3$ of the latch circuit (4).

Then, the numerical value A set by the setting circuit (5), the numerical value B held by the latch circuit (4), and the accumulated value Z output from the arithmetic operation unit (7) have the following relationship.

$$Z = B + A \quad \text{(directional input DR = "1")} \tag{2}$$

$$Z = B - A \quad \text{(directional input DR = "0")} \tag{3}$$

Since in these cases A and B denote numerical values of four decimal digits, the carry to an upper $10^4$ order will be generated in the equation (2). In the equation (3), the borrow from the order of $10^4$ will be generated.

When such a carry or borrow occurs, the carry/borrow signal CB is at the high "1" level.

In addition, the output pulse train $PT_1$, which is the output signal of the AND gate circuit, is supplied to an output terminal (8) while the directional input DR is supplied to an output terminal (9). These output terminals (8) and (9) are connected to a counter (10). The counter (10) provides the measured value V as the accumulated number of pulses by incrementally or decrementally counting the output pulse train $PT_1$ corresponding to a high or low level of the directional input DR. The measured value is also displayed.

FIGS. 2(A) to 2(G) show timing charts of each signal transmitted in the pulse forming circuit shown in FIG. 1.

Figure 2:
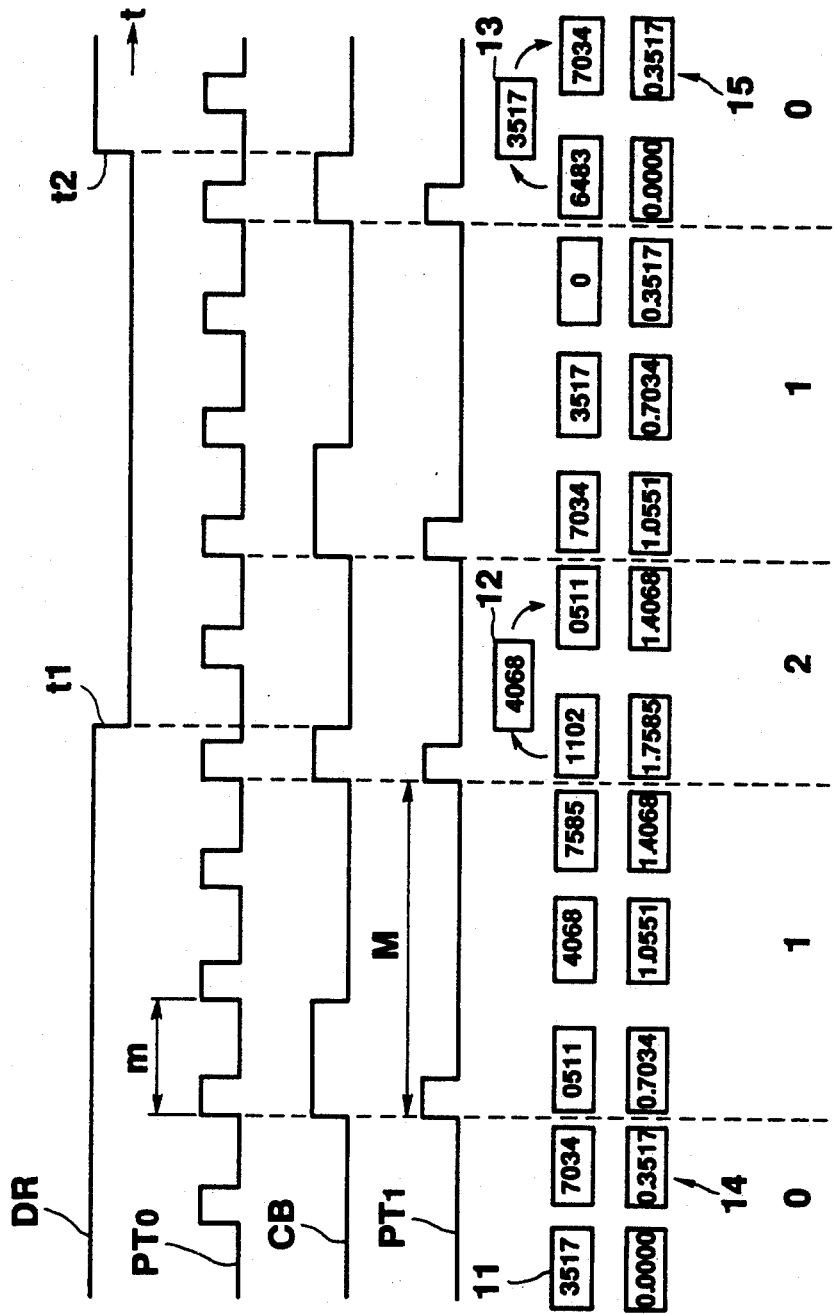
FIGS. 2(A) to 2(G) are signal timing charts of the pulse train forming circuit shown in FIG. 1.

An interval m of the input pulse train $PT_o$, in the preferred embodiment, corresponds to 0.3517 $\mu$m, which is the reference unit quantity. Therefore, the numerical value A set by the setting circuit (5) indicates "3517". In addition, both directional input DR and input pulse train $PT_o$ provide characteristics as shown in FIGS. 2 (A) and 2 (B). It is noted that in an initialized state, the numerical value B held in the latch circuit (4) indicates 0.

In this case, an initial value (11) of the accumulated number of Z indicates "3517", which is produced from the arithmetic operation unit (7). The accumulated number Z, by means of the latch circuit (4), is latched whenever the input pulse train $PT_o$ rises. During the interval of the high level "1" of the directional input DR, an amount of "3517" is added to the value of the accumulated number Z. When the value of Z changes from "7034" to "0551", the carry is generated and the carry/borrow output CB is turned to the high level "1", as shown in FIG. 2 (C). Then, the output pulse train $PT_1$ is turned to the high level "1" in synchronization with the input pulse train $PT_o$, as shown in FIG. 2 (D). In the same way, whenever the carry output to the order of $10^4$ is generated, the output pulse train $PT_1$ is turned to the high level "1". The carry output of the accumulated number Z corresponds to 1 $\mu$m of displacement so that the interval of M to the output pulse train $PT_1$ also corresponds to 1 $\mu$m.

Next, when the directional output DR is changed to the low level "0", at the time of $t_1$, the accumulated number Z of the arithmetic operation unit (7) is changed from B+A to B−A. The accumulated number Z is changed from "1102", to an intermediate value (12), see FIG. 2 (E). The intermediate value (12) indicates "4068", which is two pulses before "1102". Thereafter, whenever the input pulse train $PT_o$ rises, the accumulated value Z is latched by the latch circuit (4) so that the value of "3517" is sequentially subtracted from the accumulated value Z. Then, when the borrow output is generated from the accumulated number of Z, the carry/borrow output signal CB is turned to the high level of "1". Therefore, the output pulse train $PT_1$ is turned to the high level of "1" in synchronization with the input pulse train $PT_o$.

Furthermore, when the directional input DR is turned to the high level of "1", at the time of $t_2$, the arithmetic operation unit (7) is again operated as an adder. The accumulated number Z is changed from "6483" to an intermediate value (13) of "3517". In this way, if the level of the directional output DR is changed, the value of Z is changed by twice of the value of "3517". However, it is noted that since a change in polarity is different between the change in the directional input DR to the low level "0" than to the high level "1", the error of the accumulated value Z does not accumulatively increases.

In the preferred embodiment, the interval of n of the input pulse train $PT_o$ corresponds to 0.3517 $\mu$m. Therefore, the actual displacement X is in synchronization with the input pulse train $PT_o$, as shown in FIG. 2 (F). On the other hand, the measured value V is changed as shown in FIG. 2 (G) so as to correspond to the output pulse train $PT_1$. As appreciated from FIGS. 2 (A) through 2 (G), an error between the actual displacement X and measured value V does not reach 1 $\mu$m, which, for example is the resolution of the measured value V. In addition, at, for example, times (14) and (15) which are the same interval as the level of the directional input DR, the error between the actual displacement X and the measured value V are the same.

Figure 3:
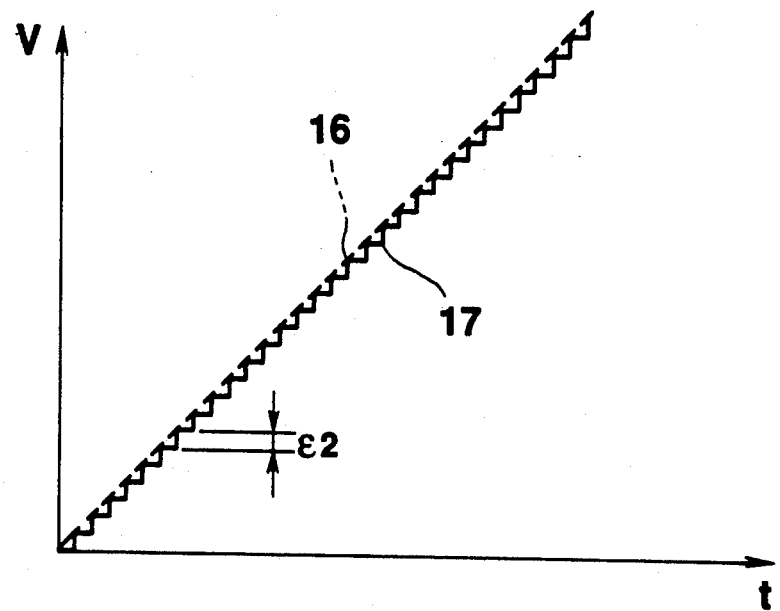
FIG. 3 is a characteristic graph of a measured value derived in the pulse forming circuit shown in FIG. 1.
Figure 4:
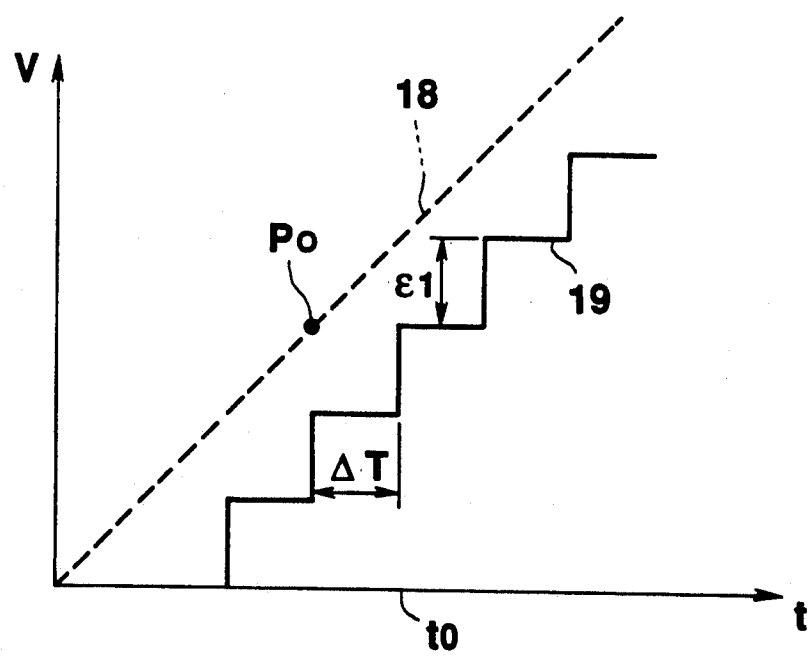
FIG. 4 is a characteristic graph of a measured value derived in a previously proposed pulse train forming circuit explained in the BACKGROUND OF THE INVENTION.

If the actual displacement X is increases as shown in the broken line (16) of FIG. 3, the measured value V increases stepwise at the interval of substantially 1 $\mu$m, as denoted by the solid line (17). In this case, the measured value changes on a real time basis following the actual displacement X. A maximum value $\epsilon_2$ of the error between the measured value V and actual displacement X is substantially below 1 $\mu$m.

The interval of the input pulse train $PT_o$ corresponds to 0.3517 $\mu$m. The interval of the output pulse train $PT_1$ corresponds accurately to 1 $\mu$m, in which the decimal fraction is omitted. In this way, in a case where the decimal fraction is omitted, the following processing becomes facilitated. Furthermore, the output pulse train $PT_1$ is sequentially, or on real time basis, generated in synchronization with the input pulse train $PT_o$. Hence, in a case where the output pulse train is used as a feedback element for NC machine tool, the hunting does not occur because of the responsive characteristic. Furthermore, since the circuit in the preferred embodiment is mainly constituted by adder/subtractors, the circuit construction is simplified and can be extended easily.

In the preferred embodiment, although the numerical value A set by the setting circuit (5) is fixed, the wavelength of the laser beam changes according to the room temperature or air pressure when used as a laser interferometer. The set numerical value A may be changed according to the change in its wavelength. In this way, if the numerical value changes, a correction of a wavelength can be carried out on the real time basis.

Figure 5:
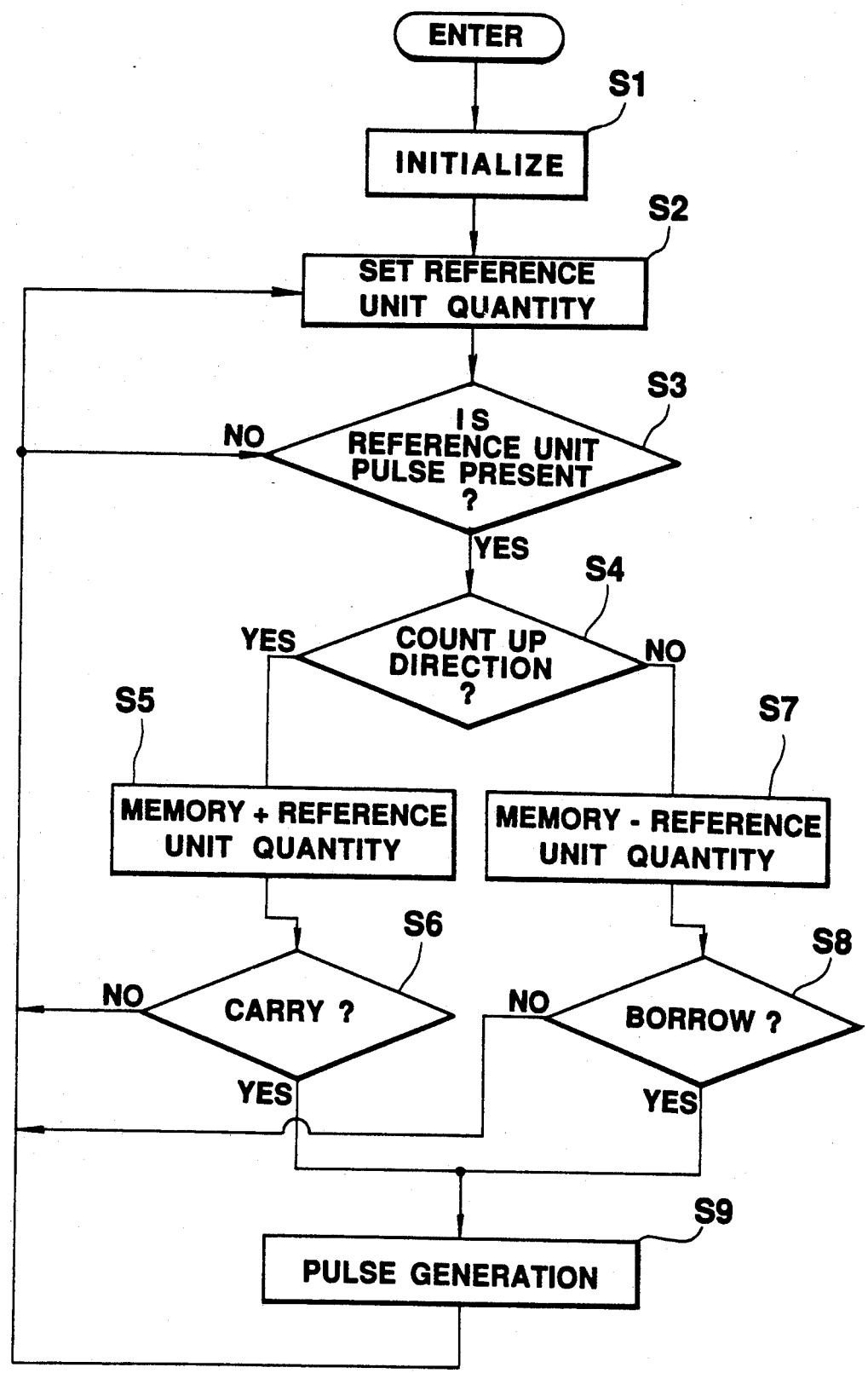
FIG. 5 is an operational flowchart executed by a microcomputer as a method for forming a pulse train according to the present invention.

Next, FIG. 5 shows a method for forming the pulse train in another preferred embodiment using a microcomputer.

It is noted that the microcomputer is provided with a program whose flowchart is shown in FIG. 5 and the same circuit construction as FIG. 1 is incorporated into the microcomputer.

In a step S1, the microcomputer is initialized. For example, the setting circuit (5), arithmetic operation unit (7) and latch circuit (4) are all initialized.

Then, in a step S2, the reference unit quantity is set, for example, 0.3517.

Then, in a step S3, the microcomputer determines whether the reference unit pulse is received from the input end (1). Next, in a step S4, the microcomputer determines whether the directional input DR indicates an incremental direction when the reference unit pulse is input.

If the directional input DR indicates the incremental direction in step S4, the routine goes to a step S5 in which the memory value stored as the accumulated number of reference unit pulse is incremented. In a step S6, the microcomputer determines whether the added result gives a carry. If the carry is generated, the routine goes to a step S7 in which a pulse is generated indicating a numerical value of 1. Whenever the carry is generated, the numerical value is incremented. If the directional input DR indicates a decremental direction, the memory value is decremented in a step S8. If a borrow is generated in a step S9, the routine goes to the step S7 in which the pulse is generated decrementing the accumulated numerical value. The detailed operation shown in FIG. 5 is the same as those shown in FIGS. 2 (A) through 2 (G).

Recently, an application of a holography technique permits, as well as the laser interferometer, a manufacturing of an optical scale having an optical pitch of approximately 0.5 $\mu$m. The interval of the reference unit input pulse from a detecting head of the optical scale can correspond to, e.g., 0.54 $\mu$m/4, or i.e., 0.125 $\mu$m. Then, this reference unit pulse is supplied to the pulse forming circuit shown in FIG. 1. The setting circuit (5) is set to "125", the adder/subtractors (6C) serve as binary adder/subtractors and the carry/borrow output of the binary adder/subtractors is supplied to the other input terminal of the AND gate circuit (3). Therefore, the interval of the derived output pulse train $PT_1$ can correspond to the displacement of substantially 2 $\mu$m. In this case, although the scale pitch of the optical scale may partially be changed, the value of the setting circuit (5) is partially replaced with its calibrated value, with the scale pitch calibrated so that the correction of the setting value V can be carried out on a real time basis.

Although, in the preferred embodiment, the adder/subtractors (6A) through (6D) of one decimal digit have been used, the adder/subtractors of a plurality of decimal digits, or of hexadecimal adder/subtractors may be used.

In this way, if the binary or decimal number of the arithmetic operation unit (7) is changed, the pulse forming circuit may correspond to any numerical system.

As described hereinabove, since the pulse forming circuit according to the present invention can generate the output pulse train whose interval corresponds to the physical quantity in which the decimal fraction is omitted. This occurs even through the interval of the input pulse train corresponds to the physical quantity having the decimal fraction.

It will fully be appreciated by those skilled in the art that the foregoing description is in terms of the preferred embodiments and various changes and modifications may be made without departing from the scope of the present invention which is to be defined by the appended claims.

What is claimed is:

1. An apparatus for forming a pulse train, comprising:
   a) at least one sign-less adder/subtractor for adding or subtracting a numerical value corresponding to a reference unit quantity whenever one pulse is input, the one input pulse corresponding to the reference unit quantity which is less than a predetermined unit quantity; and
   b) a pulse generating circuit for generating an output pulse train whose interval corresponds to the predetermined unit quantity in response to either a carry output as the result of addition by the adder/subtractor or borrow output as the result of subtraction by the adder/subtractor.

2. An apparatus as set forth in claim 1, wherein the pulse generating circuit comprises:
   a) a setting circuit for setting and providing a numerical value corresponding to the reference unit quantity;
   b) a latch circuit for latching either the addition result or subtraction result derived from the adder/subtractor whenever the one pulse is received, and
   c) an AND gate circuit which receives the one input pulse and a signal indicating occurrence of either the carry or borrow and outputs the logical AND signal indicating the pulse corresponding to the predetermined quantity.

3. An apparatus as set forth in claim 2, wherein the sign-less adder/subtractor comprises a plurality of adder/subtractors, each of which has input terminals receiving the signals of the numerical value derived from the setting circuit and from the latch circuit, has addition/subtraction terminals receiving a directional signal indicating a command to the adder/subtractors to perform either addition or subtraction, and a carry/borrow output terminal which receives either a carry signal or borrow signal when either the carry or borrow occurs from an adjacent adder/subtractor, the carry/borrow output terminal of an adder/subtractor placed at a most significant digit outputs either a carry or borrow output signal to the AND gate circuit.

4. An apparatus as set forth in claim 3, wherein the number of adder/subtractors corresponds to the number of digits of the reference unit quantity and the number of either the carry or borrow signals derived from the most significant digit adder/subtractor indicates the perdetermined quantity.

5. An apparatus as set forth in claim 4, wherein the adder/subtractors comprise four decimal digit adder/subtractors, the output setting circuit providing a four decimal digit numerical value, and the latch circuit latches the four decimal digit numerical value derived from each adder/subtractor.

6. An apparatus as set forth in claim 5, wherein the reference unit quantity is 0.3517 $\mu$m (micrometers) and the predetermined quantity is 1 $\mu$m.

7. An apparatus as set forth in claim 6, wherein the one pulse has an interval to the next one pulse corresponding to 0.3517 $\mu$m and the one pulse is derived from a laser interferometer.

8. An apparatus as set forth in claim 7, which further includes a display unit for sequentially displaying a value corresponding to the predetermined quantity whose decimal fraction is omitted whenever the signal from the AND gate circuit is received.

9. An apparatus for forming a pulse train, comprising:
   a) a setting circuit for generating a first numerical value corresponding to a reference unit quantity;
   b) an adding/subtracting circuit for adding or subtracting said first numerical value with a previously added or subracted result whenever an input pulse is received, said input pulse representing said first numerical value;
   c) a latch circuit for latching the result of an addition or a subtraction performed by said adding/subtracting circuit;
   d) a direction determining circuit for generating a direction signal which sets said adding/subtracting circuit to either an addition mode or a subtraction mode; and
   e) a pulse generating circuit for generating an output pulse indicating a predetermined unit quantity whenever said adding/subtracting circuit performs either a borrow operation or a carry operation.

10. An apparatus for forming a pulse train as set forth in claim 9, further comprising counting means for receiving said output pulse from said pulse generating circuit and for receiving said direction signal and for either adding or subtracting one predetermined unit quantity from a previous result and for displaying a current result.

11. An apparatus for forming a pulse train as set forth in claim 9, wherein said adding/subtracting circuit is comprised of a plurality of adder/subtractors with each adder/subtractor of said plurality of adder/subtractors outputting a digit of said reference unit quantity.

12. An apparatus for forming a pulse train as set forth in claim 9, wherein said pulse generating circuit receives a carry/borrow output from said adder/subtrator circuit and said input pulse and generates said output pulse when both said carry/borrow output and said input pulse are of a high level.

13. An apparatus for forming a pulse train as set forth in claim 9, wherein the result latched by said latch circuit, said first numerical value generated by said setting circuit, and the result of said adding/subtracting circuit are all four digit decimal numerals.

* * * * *